United States Patent
Zhang et al.

(10) Patent No.: US 10,222,890 B2
(45) Date of Patent: Mar. 5, 2019

(54) PRESSURE SENSING PANEL AND METHOD FOR FABRICATING THE SAME, DISPLAY DEVICE AND FORCE TOUCH METHOD

(71) Applicant: BOE TECHNOLOGY GROUP CO., LTD., Beijing (CN)

(72) Inventors: Chunfang Zhang, Beijing (CN); Yanling Han, Beijing (CN); Zhiqiang Xu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 154 days.

(21) Appl. No.: 15/227,065

(22) Filed: Aug. 3, 2016

(65) Prior Publication Data
US 2017/0269753 A1   Sep. 21, 2017

(30) Foreign Application Priority Data
Mar. 16, 2016   (CN) .......................... 2016 1 0151539

(51) Int. Cl.
*G06F 3/041* (2006.01)
*G01L 5/00* (2006.01)

(52) U.S. Cl.
CPC .......... *G06F 3/0414* (2013.01); *G01L 5/0038* (2013.01); *G06F 2203/04103* (2013.01)

(58) Field of Classification Search
CPC ......... G01L 5/0038; G01L 13/00; G01L 7/00; G06F 2203/04103; G06F 3/0414
See application file for complete search history.

(56) References Cited

U.S. PATENT DOCUMENTS

| 2009/0267906 A1* | 10/2009 | Schroderus ........... G06F 3/0414 |
| | | 345/173 |
| 2011/0007023 A1* | 1/2011 | Abrahamsson ..... G02F 1/13338 |
| | | 345/174 |

(Continued)

FOREIGN PATENT DOCUMENTS

| CN | 102016769 A | 4/2011 |
| CN | 102375586 A | 3/2012 |

(Continued)

OTHER PUBLICATIONS

English Translation of CN103257007.*

(Continued)

*Primary Examiner* — Hong Zhou
(74) *Attorney, Agent, or Firm* — Nath, Goldberg & Meyer; Joshua B. Goldberg

(57) ABSTRACT

The present invention provides a pressure sensing panel, which includes a carrying substrate, a gas cell layer formed on the carrying substrate and a gas pressure sensor, wherein the gas cell layer includes at least one gas cell, a predetermined amount of gas is sealed in each gas cell, and at least one gas pressure sensor is provided inside each gas cell. The present invention further provides a display device, a method for fabricating the pressure sensing panel and a force touch method using the display device. In the present invention, deformation of the gas cell is physical deformation, which is hardly affected by the surroundings, so the level of force applied to the display device can be determined accurately by using the pressure sensing panel provided by the present invention, and further, operation can be performed accurately.

3 Claims, 3 Drawing Sheets

(56) References Cited

U.S. PATENT DOCUMENTS

| | | | | |
|---|---|---|---|---|
| 2011/0010114 A1* | 1/2011 | Xu | ............................ | G01D 5/42 |
| | | | | 702/50 |
| 2012/0042735 A1* | 2/2012 | Mei | ........................ | G06F 3/0338 |
| | | | | 73/862.636 |
| 2012/0193211 A1* | 8/2012 | Ciesla | .................... | G06F 3/0202 |
| | | | | 200/81 H |
| 2013/0012078 A1* | 1/2013 | Fischer | .............. | B01L 3/502707 |
| | | | | 439/884 |
| 2013/0096849 A1* | 4/2013 | Campbell | .............. | G06F 3/0414 |
| | | | | 702/42 |
| 2016/0334913 A1* | 11/2016 | Pan | ........................ | G06F 3/0414 |
| 2017/0010166 A1* | 1/2017 | Zhang | .................. | G01L 19/0084 |

FOREIGN PATENT DOCUMENTS

| | | | | |
|---|---|---|---|---|
| CN | 102803126 A | | 11/2012 | |
| CN | 103124946 A | | 5/2013 | |
| CN | 103257007 A | | 8/2013 | |
| CN | 103257007 B | * | 7/2015 | ............. G01L 17/00 |

OTHER PUBLICATIONS

Chinese office action dated Mar. 29, 2018 for corresponding application No. 201610151539.6 with English translation attached.

\* cited by examiner

PRESSURE SENSING PANEL AND METHOD FOR FABRICATING THE SAME, DISPLAY DEVICE AND FORCE TOUCH METHOD

FIELD OF THE INVENTION

The present invention relates to a pressure sensing panel and a method for fabricating the same, a display device including the pressure sensing panel and a force touch method using the same.

BACKGROUND OF THE INVENTION

Recently, as a new touch technique, force touch, has been introduced into electronic mobile terminals such as smart watches and smart phones, there has aroused an upsurge in the research of force touch in the industry.

Current force touch is usually implemented in a capacitive or resistive manner, which is quite similar to the manner in which a touch panel is implemented. The capacitive force touch is realized using the principle of body's current sensing, and the resistive force touch is realized using the principle of pressure sensing. However, high accuracy and sensitivity in touch control cannot be achieved in the prior art.

Therefore, a force touch display device and a force touch method are urgently needed to solve the above problem in the prior art.

SUMMARY

An object of the present invention is at least to provide a pressure sensing panel and a method for fabricating the same, a display device including the pressure sensing panel and a force touch method using the same, and when performing force touch on the display device, influence from electromagnetic signals will not be caused.

To achieve the above object, as an aspect of the present invention, there is provided a pressure sensing panel, which includes a carrying substrate, a gas cell layer provided on the carrying substrate and a gas pressure sensor, wherein the gas cell layer includes at least one gas cell each having a predetermined amount of gas sealed therein, and at least one gas pressure sensor is provided inside each gas cell.

Preferably, the carrying substrate includes a rigid substrate, a sealing film and a sealing plug, at least one gas hole is formed in the rigid substrate, each gas hole is provided therein with one sealing plug used for sealing the gas hole, each gas cell corresponds to at least one gas hole, and the sealing film is adhered to a surface of the rigid substrate away from the gas cell layer.

Preferably, the pressure sensing panel further includes a mounting substrate provided on a surface of the gas cell layer away from the carrying substrate.

Preferably, the gas cell layer includes a plurality of gas cells arranged in rows and columns.

Preferably, the gas cell layer includes one gas cell in which a plurality of gas pressure sensors are provided at different positions.

As another aspect of the present invention, there is provided a display device including a display panel, wherein the display device further includes the above pressure sensing panel provided by the present invention and a control module connected to an output terminal of each gas pressure sensor in the pressure sensing panel, the pressure sensing panel is provided on a back surface of the display panel, the control module being capable of determining a force level corresponding to a current touch operation according to gas pressure detected by the gas pressure sensor.

As still another aspect of the present invention, there is provided a method for fabricating the above pressure sensing panel, which includes steps of:

providing the gas cell layer and at least part of the carrying substrate, respectively, the gas cell layer including at least one gas cell;

adhering the gas cell layer to the at least part of the carrying substrate; and filling each gas cell with a predetermined amount of gas, at least one gas pressure sensor being provided inside each gas cell.

Preferably, the carrying substrate includes a rigid substrate, a sealing film and a sealing plug, and the step of providing the gas cell layer and at least part of the carrying substrate includes providing the rigid substrate and forming at least one gas hole in the rigid substrate, and each gas cell corresponds to at least one gas hole; and the method further includes a step of providing the gas pressure sensor on the rigid substrate, after the step of providing the gas cell layer and at least part of the carrying substrate respectively and before the step of adhering the gas cell layer to the at least part of the carrying substrate;

in the step of filling each gas cell with the predetermined amount of gas, the gas cell is filled with the predetermined amount of gas through the gas hole; and the method further includes steps of sealing the gas hole by using the sealing plug and adhering the sealing film to the surface of the rigid substrate opposite to the gas cell layer, after the step of filling the gas cell with the predetermined amount of gas.

Preferably, the method further includes a step of adhering a mounting substrate to the surface of the gas cell layer away from the carrying substrate.

Preferably, the gas cell layer includes a plurality of gas cells arranged in rows and columns; or the gas cell layer includes one gas cell in which a plurality of gas pressure sensors are provided at different positions.

As yet another aspect of the present invention, there is provided a force touch method using the above display device provided by the present invention, which includes steps of:

detecting, in real time, gas pressure in the gas cell;

determining, according to a level of the detected gas pressure in the gas cell, a force level of touch force; and driving, according to the force level of touch force, the display panel to perform a corresponding operation.

Preferably, the method further includes a step of measuring, before the step of detecting gas pressure in the gas cell in real time, an initial gas pressure in the gas cell in a state without touch; and the step of determining a force level of touch force according to a level of the detected gas pressure in the gas cell includes: calculating a pressure difference between the gas pressure in the gas cell detected in real time and the initial gas pressure in the gas cell, and determining the force level of touch force according to the pressure difference.

Preferably, the step of determining the force level of touch force according to the pressure difference includes:

setting at least one preset value which defines multiple pressure intervals, each pressure interval corresponding to one force level of touch force; and comparing the pressure difference with each preset value to determine the force level of touch force.

For a display device including the above pressure sensing panel provided by the present invention, when a user touches a display surface of the display device including the pressure sensing panel with a finger, certain touch force (pressure) is applied to the display device and transferred to the pressure sensing panel via a display panel, which causes reduction in volume of the gas cell. Correspondingly, the gas pressure detected by the gas pressure sensor becomes higher, and a corresponding pressure sensing signal is generated based on the detected gas pressure. The gas pressure sensor transmits the pressure sensing signal to the control module of the display device including the pressure sensing panel. The control module determines a level of touch force according to the gas pressure detected by the gas pressure sensor, and controls the display device to perform a corresponding operation.

In the present invention, deformation of the gas cell(s) is physical deformation, which is hardly affected by the surroundings, so the level of pressure applied to the display device can be determined accurately by using the pressure sensing panel provided by the present invention, and further, operation can be performed accurately.

BRIEF DESCRIPTION OF THE DRAWINGS

The accompanying drawings, which constitute a part of the specification and are provided for a further understanding of the present invention, are used for explaining the present invention together with the following specific implementations, but not intended to limit the present invention. In the drawings.

DETAILED DESCRIPTION

Specific embodiments of the present invention will be described below in detail in conjunction with the accompanying drawings. It should be understood that the specific embodiments to be described herein are only intended to illustrate and explain the present invention, but not to limit the present invention.

Figure 1:
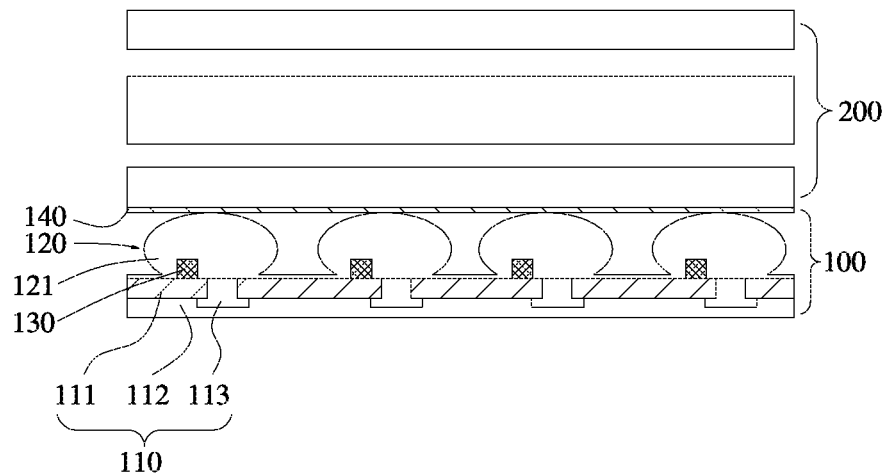
FIG. 1 is a schematic diagram of a display device provided by the present invention.

As illustrated in FIG. 1, as an aspect of the present invention, there is provided a pressure sensing panel 100, which includes a carrying substrate 110, a gas cell layer 120 provided on the carrying substrate 110 and a gas pressure sensor 130, wherein the gas cell layer 120 includes at least one gas cell 121 having a predetermined amount of gas sealed therein, and at least one gas pressure sensor 130 is provided inside each gas cell 121.

It would be easily understood by those skilled in the art that gas pressure in the gas cell 121 can be calculated by using the following equation:

$$P=nRT/V,$$

where P is gas pressure in the gas cell, n is the amount of substance of gas within the gas cell, R is a constant, T is temperature and V is volume of the gas cell.

It needs to be noted that the gas cell 121 is made of an elastic material. The gas cell 121 is compressed and thus shrinks when a force is applied to the pressure sensing panel 100, so the volume V of the gas cell 121 is decreased. Since the amount of substance of gas in the gas cell 121 is constant, it can be known from the above equation that the gas pressure P in the gas cell will be increased. The gas pressure sensor 130 will generate a corresponding pressure sensing signal based on the detected gas pressure.

When a user touches a display surface of the display device including the pressure sensing panel with a finger, touch force (pressure) is applied to the display device and transferred to the pressure sensing panel via a display panel 200, which causes reduction in volume of the gas cell 121. Correspondingly, the gas pressure detected by the gas pressure sensor 130 becomes higher, and a corresponding pressure sensing signal is generated by the gas pressure sensor 130 based on the detected gas pressure. The gas pressure sensor 130 transmits the pressure sensing signal to a control module of the display device including the pressure sensing panel 100. The control module determines a level of touch force according to the magnitude of the gas pressure detected by the gas pressure sensor 130, and controls the display device to perform corresponding operation.

In the present invention, deformation of the gas cell is physical deformation, which is hardly affected by the surroundings, so the level of pressure applied to the display device can be determined accurately by using the pressure sensing panel provided by the present invention, thereby allowing accurate operation of the display device.

As described above, the gas cell 121 is sealed. To ensure that the gas cell 121 has a predetermined amount of gas sealed therein, as illustrated in FIG. 1, it is preferable that the carrying substrate 110 includes a rigid substrate 111 and a sealing film 112, wherein at least one gas hole (for example, gas holes 111a illustrated in FIGS. 4c and 4d) is formed in the rigid substrate 111, each gas hole has one sealing plug 113 inserted therein and used for sealing the gas hole, each gas cell 121 corresponds to at least one gas hole, and the sealing film 112 is adhered to a surface of the rigid substrate 111 away from the gas cell layer 120.

During the fabrication of the pressure sensing panel 100, first, the gas cell layer 120 is provided at one side of the rigid substrate 111 in a fixed manner; then, each gas cell 121 of the gas cell layer 120 is inflated through the gas hole(s) until the gas cell has the predetermined amount of gas therein; and subsequently, each gas hole is sealed by the sealing plug 113 and the sealing film 112 is then adhered to the other side of the rigid substrate 111.

With the double sealing achieved by the sealing plug 113 and the sealing film 112, it can be ensured that gas in the gas cell 121 will not leak out, thereby allowing accurate determination of the level of touch force by the pressure sensing panel 100.

As described above, the pressure sensing panel 100 is provided in the display device and can be adhered to a back surface of the display panel. To facilitate assembly, it is preferable that the pressure sensing panel 100 may further include a mounting substrate 140 provided on a surface of the gas cell layer 120 away from the carrying substrate 110. When the display panel 200 and the pressure sensing panel 100 are assembled together, the mounting substrate 140 is adhered to the back surface of the display panel 200, that is, a surface opposite to the display surface.

Figure 2:
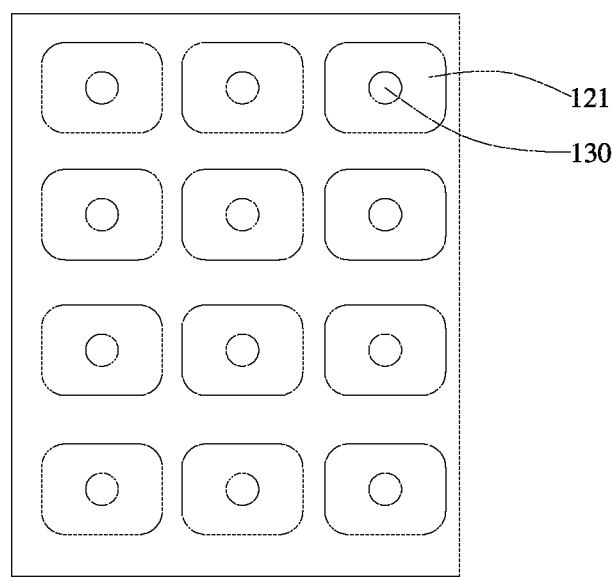
FIG. 2 is a top view of a first implementation of a pressure sensing panel provided by the present invention.

The number of gas cells 121 in the gas cell layer 120 is not particularly limited in the present invention. For example, according to an embodiment of the present invention, the gas cell layer 120 may include a plurality of gas cells 121 arranged in rows and columns, as illustrated in FIG. 2. In this implementation, one gas pressure sensor 130 may be provided in each gas cell 121.

Figure 3:
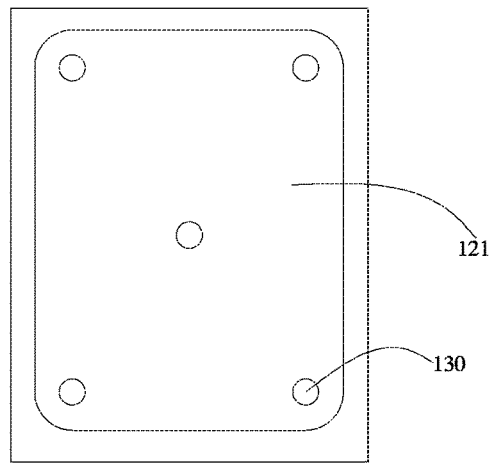
FIG. 3 is a top view of a second implementation of the pressure sensing panel provided by the present invention.

According to another embodiment of the present invention, as illustrated in FIG. 3, the gas cell layer 120 may include only one gas cell 121, and a plurality of gas pressure sensors 130 are provided at different positions in the one gas cell 121.

As another aspect of the present invention, there is provided a display device including a display panel 200, wherein the display device further includes the pressure sensing panel 100 and a control module connected to an output terminal of each gas pressure sensor 130, the pressure sensing panel 100 is provided on a back surface of the display panel 200, and the control module is capable of determining a force level corresponding to a current touch operation according to gas pressure detected by the gas pressure sensor 130, and different force levels correspond to different operations.

Once the force level corresponding to the current touch operation is determined, it can be easy to distinguish whether a force touch operation or a tap operation is performed on the display panel, and then the display device is controlled to perform corresponding operation according to the force level of touch force.

For example, if touch force is small, a first operation menu will pop up on an operation interface, and if touch force is large, a second operation menu will pop up on the operation interface, wherein the first and second operation menus may have different contents and different functions.

As a specific implementation, the touch force may be divided into two levels, one is a level in which corresponding gas pressure is less than or equal to 1 Pa, and the other is a level in which corresponding gas pressure is greater than 1 Pa. The level in which corresponding gas pressure is less than or equal to 1 Pa corresponds to the tap operation, and the level in which corresponding gas pressure is greater than 1 Pa corresponds to a press operation. In a case where the touch force corresponds to gas pressure larger than 1 Pa, the display panel 200 can be driven to perform the press operation, and in a case where the touch force corresponds to gas pressure less than or equal to 1 Pa, the display panel 200 can be driven to perform the tap operation.

In the present invention, specific type of the press operation is not particularly limited. For example, in a case where a touch point is at a position of a folder, the press operation may indicate an operation of opening the folder, and the tap operation may indicate an operation such as unlocking or the like. It is needless to say that the above only illustrates examples of the tap operation and the press operation, and the present invention is not limited thereto.

As described above, gas pressure in the gas cell only depends on touch force and is hardly affected by ambient conditions, so the display device may respond to the force touch operation and the tap operation accurately.

As another aspect of the present invention, there is provided a method for fabricating the above pressure sensing panel provided by the present invention, which includes steps of:

providing the gas cell layer and at least part of the carrying substrate, respectively, the gas cell layer including at least one gas cell;

adhering the gas cell layer to the at least part of the carrying substrate; and filling the gas cell with a predetermined amount of gas, at least one gas pressure sensor being provided inside each gas cell.

In the present invention, the step of providing at least part of the carrying substrate includes the following two cases. In a case where the carrying substrate includes a single-layer structure, the entire carrying substrate may be provided, and in a case where the carrying substrate includes multiple layers, one or more of the multiple layers of the carrying substrate can be provided first.

The gas cell layer may be adhered to the carrying substrate by using adhesion agent.

In a preferable implementation of the present invention, the carrying substrate includes a rigid substrate, a sealing film and a sealing plug, and the step of providing the gas cell layer and at least part of the carrying substrate includes providing the rigid substrate and forming at least one gas hole in the rigid substrate, each gas cell corresponding to at least one gas hole.

The method further includes steps of:

providing the gas pressure sensor on the rigid substrate, after the step of respectively providing the gas cell layer and at least part of the carrying substrate and before the step of adhering the gas cell layer to the at least part of the carrying substrate;

filling the gas cell with the predetermined amount of gas through the gas hole, which is included in the step of filling the gas cell with the predetermined amount of gas; and sealing the gas hole by using the sealing plug, and adhering the sealing film to the surface of the rigid substrate opposite to the gas cell layer, after the step of filling the gas cell with the predetermined amount of gas.

Preferably, the method further includes a step of adhering the mounting substrate to the surface of the gas cell layer away from the carrying substrate.

In the present invention, the step of adhering the mounting substrate to the surface of the gas cell layer away from the carrying substrate may be performed either before or after the step of adhering the gas cell layer to the carrying substrate, which is not limited in the present invention.

Preferably, the gas cell layer includes a plurality of gas cells arranged in rows and columns; or the gas cell layer includes one gas cell in which a plurality of gas pressure sensors are provided at different positions.

Figure 4A:
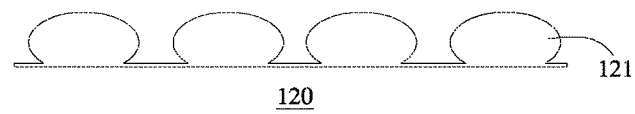
FIGS. 4a to 4f are diagrams illustrating processes of fabricating a pressure sensing panel provided by the present invention.
Figure 4B:
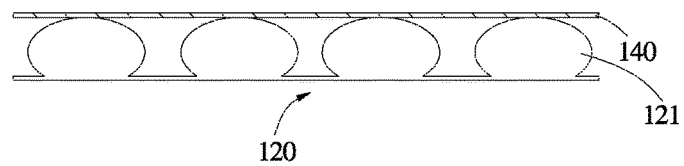
Figure 4C:
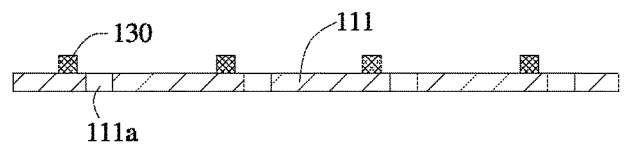
Figure 4D:
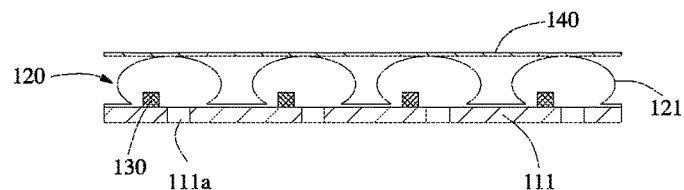
Figure 4E:
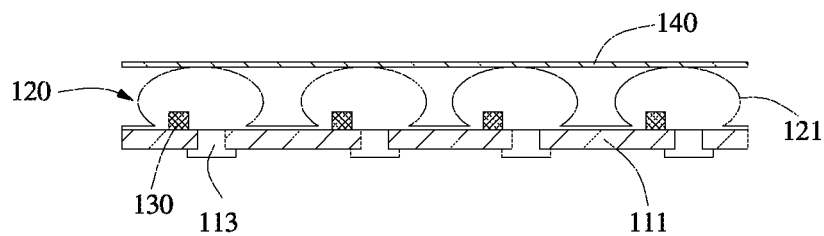
Figure 4F:
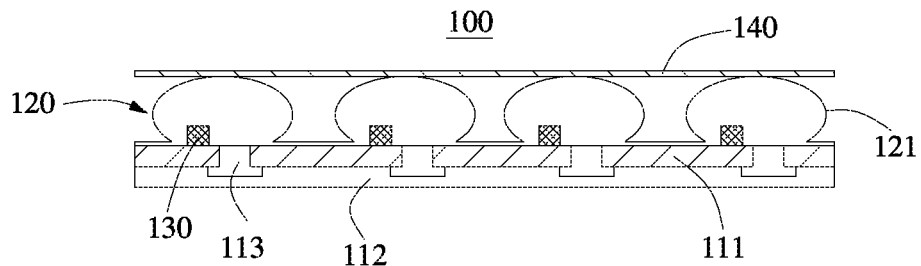

FIGS. 4a to 4f illustrate a specific implementation of a method for fabricating the pressure sensing panel provided by the present invention, which includes steps of:

providing the gas cell layer 120 which includes a plurality of gas cells 121, as illustrated in FIG. 4a;

providing the mounting substrate 140 at one side of the gas cell layer 120, as illustrated in FIG. 4b;

providing the rigid substrate 111, providing a plurality of gas holes 111a in the rigid substrate 111, and providing a plurality of gas pressure sensors 130 at one side of the rigid substrate 111, as illustrated in FIG. 4c;

providing the gas cell layer 120, which is provided with the mounting substrate 140, at one side of the rigid substrate 111 in a fixed manner, and providing each gas pressure sensor 130 inside a corresponding gas cell 121, as illustrated in FIG. 4d;

filling the gas cells 121 with gas;

sealing the gas holes 111a with the sealing plugs 113, as illustrated in FIG. 4e; and providing the sealing film 112 at the other side of the rigid substrate 111, so that the pressure sensing panel 100 is obtained, as illustrated in FIG. 4f.

Figure 5:
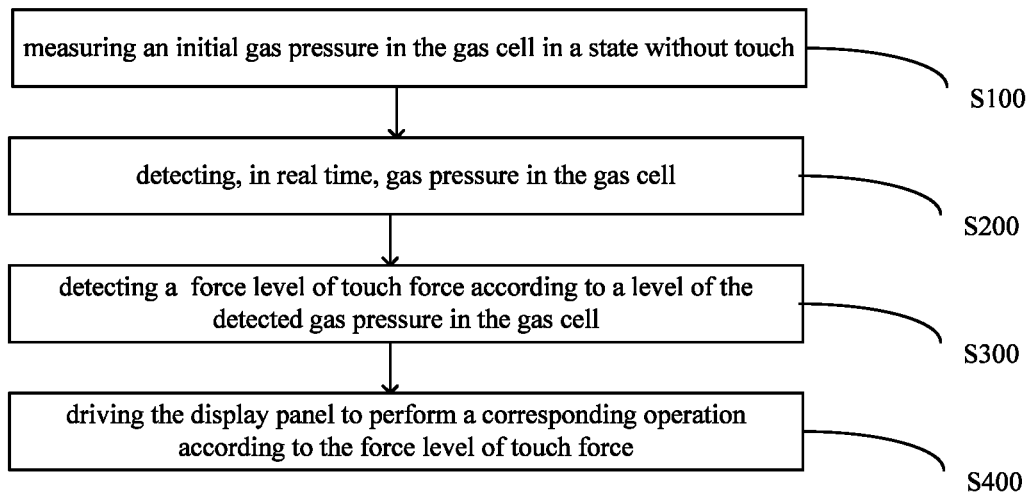
FIG. 5 is a flow chart of a force touch method provided by the present invention.

As still another aspect of the present invention, there is provided a force touch method using the above display device provided by the present invention, and as illustrated in FIG. 5, the method includes:

step S200, in which gas pressure in each gas cell 121 is detected in real time;

step S300, in which a force level of touch force is determined according to the detected level of gas pressure in the gas cell; and step S400, in which the display panel is driven to perform corresponding operation according to the force level of touch force.

As described above, when touch force is applied to the display surface of the display panel by a user, the touch force is transferred to the pressure sensing panel 100, which causes the gas cells 121 in the pressure sensing panel 100 to be compressed, thereby increasing gas pressure in the gas cells 121. In the display device, gas pressure in the gas cells 121 is changed due to touch force applied to the display panel, and the level of gas pressure in the gas cells 121 is directly proportional to the force level of touch force. Therefore, the force level of touch force can be determined according to the detected level of gas pressure in the gas cells 121.

The determination of the force level of touch force according to the method is not affected by a battery signal, and thus results with more accuracy can be obtained and a corresponding operation is performed.

Preferably, before step S200, the method further includes:

step S100, in which an initial gas pressure in each gas cell in a state without touch is measured; and correspondingly, step S300 may include:

step S310, in which a pressure difference between the gas pressure in each gas cell detected in real time and the initial gas pressure in the gas cell is calculated, and step S320, in which the force level of touch force is determined according to the pressure difference.

Preferably, step S320 includes:

step S321, in which at least one preset value for defining multiple pressure intervals is set, each pressure interval corresponding to one force level of touch force; and step S322, in which the pressure difference is compared with each preset value so as to determine the force level of touch force.

At least one preset value is preset in the control module, and defines multiple pressure intervals, and each pressure interval corresponds to one force level of touch force. The control module can compare the pressure difference with each preset value, so that the force level of touch force is determined and a first determination signal is generated correspondingly, and the first determination signal can be transmitted to a touch driving module of the display device by the control module; and the touch driving module of the display device can drive the display panel to perform a corresponding operation after receiving the first determination signal transmitted by the control module.

In a case where there is one preset value, the preset value defines two pressure intervals, i.e., an interval in which each pressure is less than or equal to the preset value and an interval in which each pressure is greater than the preset value.

In a case where there are multiple preset values, the number of pressure intervals defined by the multiple present values equals to the number of the preset values plus one. For example, in a case of two preset values, the pressure intervals defined by the two preset values are an interval in which each pressure is less than or equal to the smaller preset value, an interval in which each pressure is greater than the smaller preset value and less than or equal to the greater preset value, and an interval in which each pressure is greater than the greater preset value.

For example, three preset values, including a first preset value, a second preset value and a third preset value, may be set in the control module. For the convenience of description, the first preset value may be set as 1 Pa, the second preset value may be set as 1.5 Pa, and the third preset value may be set as 2 Pa. Thus, there may be four pressure intervals as follows: (0, 1 Pa], (1 Pa, 1.5 Pa], (1.5 Pa, 2 Pa] and (2 Pa, +∞). The force level corresponding to the pressure interval (0, 1 Pa] indicates an operation of entering an interface A, the force level corresponding to the pressure interval (1 Pa, 1.5 Pa] indicates an operation of entering an interface B, the force level corresponding to the pressure interval (1.5 Pa, 2 Pa] indicates an operation of entering an interface C, and the force level corresponding to the pressure interval (2 Pa, +∞) indicates an operation of entering an interface D.

When a user touches a light outgoing surface of the display device with a finger, the gas pressure sensor senses gas pressure in the gas cell and generates a corresponding sensing signal. The gas pressure value corresponding to the sensing signal is compared with the first preset value of 1 Pa, the second preset value of 1.5 Pa and the third preset value of 2 Pa, respectively, by the control module. If the calculated gas pressure value falls within the pressure interval (0, 1 Pa], the display panel 200 is controlled to display the interface A; if the calculated gas pressure value falls within the pressure interval (1 Pa, 1.5 Pa], the display panel 200 is controlled to display the interface B; if the calculated gas pressure value falls within the pressure interval (1.5 Pa, 2 Pa], the display panel 200 is controlled to display the interface C; and if the calculated gas pressure value is greater than 2 Pa, the display panel 200 is controlled to display the interface D.

By providing a pressure sensing panel in a force touch display device, the force touch display device and the force touch method provided by the present invention can distinguish whether a touch operation performed on the display device is a tap operation or a press operation. In addition, since whether a tap operation or a press operation is performed on the display panel is distinguished according to the change in gas pressure in the gas cell, accuracy and sensitivity of detection are enhanced and a problem of low anti-interference capability during detection in the prior art is also avoided.

It can be understood that the foregoing embodiments are merely exemplary embodiments used for describing the principle of the present invention, but the present invention is not limited thereto. Those of ordinary skill in the art may make various modifications and improvements without departing from the spirit and essence of the present invention, and these modifications and improvements shall fall into the protection scope of the present invention.

What is claimed is:

1. A method for fabricating a pressure sensing panel, wherein
the pressure sensing panel comprises a carrying substrate, a gas cell layer formed on the carrying substrate and a gas pressure sensor, the gas cell layer comprises at least one gas cell, a predetermined amount of gas is sealed in each gas cell, and at least one gas pressure sensor is provided inside each gas cell,
the method comprises steps of:
providing the gas cell layer and at least part of the carrying substrate, respectively, the gas cell layer including at least one gas cell;

adhering the gas cell layer to the at least part of the carrying substrate; and filling each gas cell with a predetermined amount of gas, wherein, at least one gas pressure sensor is provided inside each gas cell, and wherein the carrying substrate includes a rigid substrate, a sealing film and a sealing plug, and the step of providing the gas cell layer and at least part of the carrying substrate includes providing the rigid substrate and forming at least one gas hole in the rigid substrate, and each gas cell corresponds to at least one gas hole;

the method further includes a step of providing the gas pressure sensor on the rigid substrate, after the step of providing the gas cell layer and at least part of the carrying substrate respectively and before the step of adhering the gas cell layer to the at least part of the carrying substrate;

in the step of filling each gas cell with the predetermined amount of gas, the gas cell is filled with the predetermined amount of gas through the gas hole; and the method further includes steps of sealing the gas hole by using the sealing plug, and adhering the sealing film to a surface of the rigid substrate opposite to the gas cell layer, after the step of filling each gas cell with the predetermined amount of gas.

2. The method according to claim 1, further including a step of adhering a mounting substrate to a surface of the gas cell layer away from the carrying substrate.

3. The method according to claim 1, wherein the gas cell layer includes a plurality of gas cells arranged in rows and columns; or the gas cell layer includes one gas cell in which a plurality of gas pressure sensors are provided at different positions.

* * * * *